United States Patent [19]

Briand et al.

[11] 4,136,451

[45] Jan. 30, 1979

[54] DEVICE FOR MEASURING DISTANCE FOR A SKI

[75] Inventors: Pierre Briand, Le Brassus; Remy Berney, Le Sentier, both of Switzerland

[73] Assignee: Francois Golay S.A., Le Brassus, Switzerland

[21] Appl. No.: 839,366

[22] Filed: Oct. 4, 1977

[30] Foreign Application Priority Data

May 12, 1977 [CH] Switzerland ............... 5936/77

[51] Int. Cl.$^2$ ............................................. G01B 3/12
[52] U.S. Cl. ................................................. 33/141 E
[58] Field of Search .............. G01B/5/04; 33/141 R, 33/141 B, 141 E, 141 F, 141.5, 142

[56] References Cited

U.S. PATENT DOCUMENTS

| 238,563 | 3/1881 | Brown | 33/141 R |
|---|---|---|---|
| 530,686 | 12/1894 | Gray | 33/141 R |
| 1,494,055 | 5/1924 | Benko | 33/141.5 |
| 1,663,598 | 3/1928 | Holmquist | 33/141 R |
| 3,629,557 | 12/1971 | Lareau | 33/141 E |

FOREIGN PATENT DOCUMENTS

| 1302687 | 7/1962 | France | 33/141 E |
|---|---|---|---|
| 1021535 | 3/1966 | United Kingdom | 33/141 F |

*Primary Examiner*—Richard R. Stearns
*Attorney, Agent, or Firm*—Young & Thompson

[57] ABSTRACT

The present invention relates to a wheel for measuring distance for a ski, comprising drive means mounted for rotation at one end of an arm, the other end of this arm being mounted pivotally on an axle parallel to the axis of rotation of the wheel and carried by a first portion of a bracket; this first portion being connected to a second portion adapted to be fixed on the rear end of a ski in such a manner that the axis of rotation of the wheel will be perpendicular to the longitudinal axis of said ski; the wheel drives a counter and the arm is subjected to the action of a spring tending to pivot it about its axis so as to apply the wheel to the ground.

3 Claims, 2 Drawing Figures

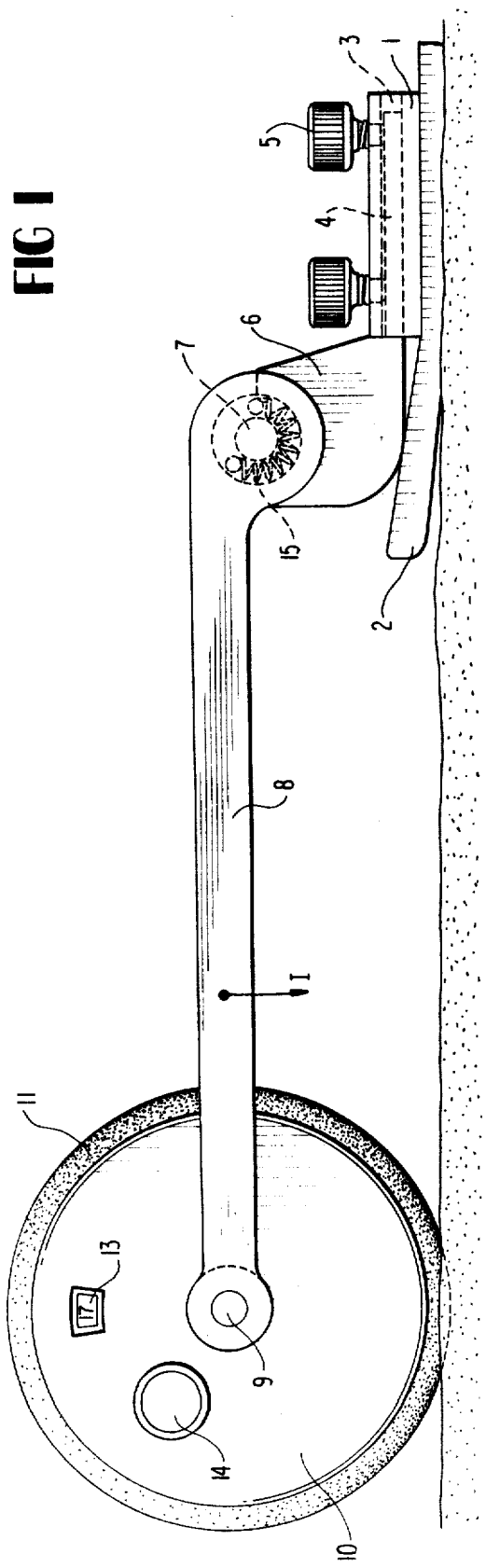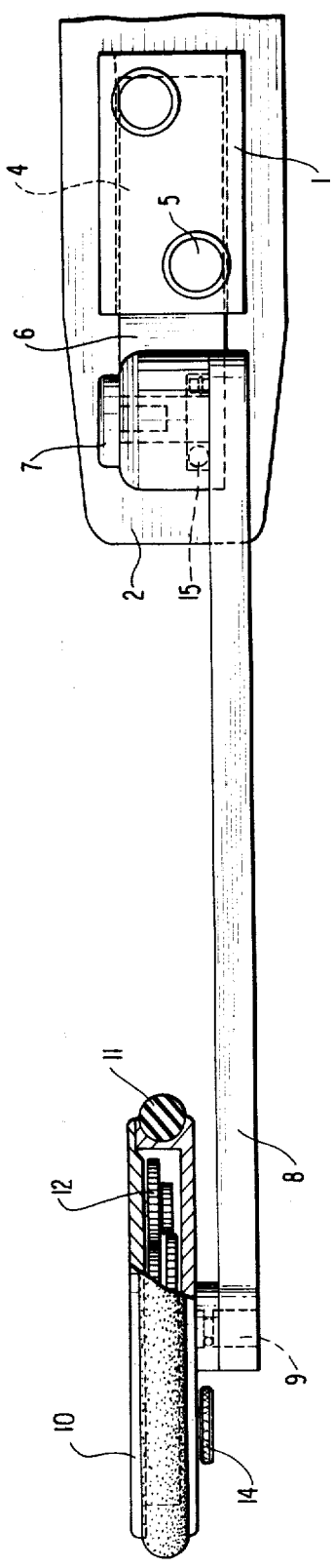

DEVICE FOR MEASURING DISTANCE FOR A SKI

The present invention concerns a device for measuring distance, for example in kilometers, for a ski, more particularly for a land ski.

This device is characterized by the fact that it comprises a drive means mounted rotatably at one end of an arm, the other end of this arm being pivotally mounted about an axis parallel to the axis of rotation of the drive means and carried by a first portion of a mounting means; by the fact that this first portion is connected to a second portion adapted to be fixed to the rear end of a ski in such manner that the axis of rotation of the drive means will be perpendicular to the longitudinal axis of said ski; by the fact that the drive means drives a counter and by the fact that the arm is subjected to the action of elastic means tending to pivot it about its axis in such a manner as to press the drive means against the ground.

The annexed drawing shows schematically and by way of example one embodiment of the device according to the invention.

FIG. 1 is a side view.
FIG. 2 is a top plan view.

The embodiment described with reference to FIGS. 1 and 2 comprises a base plate 1 secured for example by cementing to the rear end of a ski 2, for example a land ski, and traversed by a recess 3 that extends longitudinally of the ski. This recess 3 is adapted to receive in the operative position, as shown in FIGS. 1 and 2, a portion 4 in the form of a plate of a securing member, this plate 4 being locked by two screws 5. The fixing means comprises another portion 6, having an axle 7, perpendicular to the longitudinal axis of ski 2 and on which is pivotally mounted an arm 8. This arm 8 is provided at its free end with an axle 9 parallel to pivotal axle 7, and on which is rotatably mounted a wheel 10. The periphery of this wheel 10 is provided with a tire 11, of rubber or plastic material, adapted to ensure good contact with the ground and more particularly with snow. In this embodiment, the wheel 10 drives the advance of a counter disposed within a housing provided in the wheel and constituted by meshing gears 12; these gears are so arranged and sized that a whole number of turns of the wheel 10 corresponds to a whole number, for example of meters travelled, these latter being transmitted to a display device 13, at least one gear being fixed to the rotation axle 9 of the wheel 10 and at least one gear being fixed to the wheel 10 itself; in an embodiment of the counter there will be for example three turns of the wheel for one unit of distance travelled.

The counter is moreover provided with a device for resetting it to zero, actuated from the exterior by a knurled knob 14. In this embodiment the wheel is made in two hollow parts, secured together in sealed relationship so as to constitute the housing to receive the counter. The sealing may also be effected by the full tire 11.

Further, a coil spring 15 is secured on the one hand to arm 8 and on the other hand to portion 6 of the fixing means and is adapted to act resiliently in the direction of arrow I on the arm 8 so as to apply the drive means 10 to the ground, the rear end of the ski being itself on the ground or above the ground.

Plate 4 of the fixing means may also be received in recess 3 of base plate 1 from the front end of said recess, so that the arm 8 will be directed forwardly of the ski and wheel 10 bear against ski 2 in an out-of-use position.

Arm 8, according to a modification (not shown) may be constituted by two parallel rods constituting a clevis for the drive means and between which are mounted the respective axles of pivoting movement of the arm and of rotation of the drive means.

The drive means may according to another embodiment (not shown) be a wheel whose periphery is provided with teeth or grooves, or an endless belt rotatably driven about at least two axes parallel to the pivotal axis of the arm.

In still other embodiments (not shown), the counter may be driven by means of a small wheel cooperating frictionally with the drive means of the device or by means of a lug fixed to the drive means and cooperating with a toothed wheel of the counter; in these two variants, the counter is fixed to the arm, and may for example be of the same type as those found in cycles.

The device of the invention may be made for example of plastic material or light metal, for example aluminum or aluminum alloys. It is of simple design and construction, and provides good precision in the measurement of distance traversed, the continued contact of the drive means with the snow being especially promoted by the track made by the ski.

Furthermore, this device does not inconvenience the skier in any way, because its weight is compensated by the elastic means urging the arm, when the rear of the ski is raised, for example, in the course of movements necessary for tracking.

What we claim is:

1. In combination with a ski, a device for measuring distance traveled by the ski, said device comprising an arm that extends lengthwise of the ski to the rear of the ski, a wheel mounted for rotation on the rear end of the arm about an axis perpendicular to the length of the ski, an axle parallel to the axis of the wheel, at the front end of the arm, on which the arm is mounted for vertical swinging movement, a counter associated with the wheel for counting revolutions of the wheel and for displaying said revolutions of the wheel as the distance traveled by the ski, a support for said axle at the forward end of the arm, a female bracket secured to the rear end of the ski that receives a male portion of said support, clamping means for releasably clamping said male portion in said bracket, said wheel being disposed in the track of said ski, and a spring urging said arm downwardly about said axle at the forward end of said arm.

2. A device as claimed in claim 1, said male portion being insertable into said female bracket from either end of said female bracket, whereby said measuring device has an operative position in which said male member is inserted in said bracket from the rear and an inoperative position in which said male member is inserted in said bracket from the front.

3. A device as claimed in claim 1, in which said spring is a coil spring disposed in an arcuate configuration coaxial with said axle at the forward end of said arm.